United States Patent
Dallenbach et al.

(10) Patent No.: US 7,187,185 B2
(45) Date of Patent: Mar. 6, 2007

(54) AREA-CHANGE SENSING THROUGH CAPACITIVE TECHNIQUES

(76) Inventors: William D. Dallenbach, 1560 Belleville Way, Sunnyvale, CA (US) 94087; Divyasimha Harish, 4540 Beacon Bay Dr., Union City, CA (US) 94587

( * ) Notice: Subject to any disclaimer, the term of this patent is extended or adjusted under 35 U.S.C. 154(b) by 0 days.

(21) Appl. No.: 11/237,353

(22) Filed: Sep. 28, 2005

(65) Prior Publication Data

US 2006/0066319 A1    Mar. 30, 2006

(51) Int. Cl.
    *G01R 27/26* (2006.01)
(52) U.S. Cl. ....................................................... 324/662
(58) Field of Classification Search ................ 324/660, 324/662
    See application file for complete search history.

(56) References Cited

U.S. PATENT DOCUMENTS

| | | | | |
|---|---|---|---|---|
| 3,928,796 | A * | 12/1975 | Kaiser | 324/725 |
| 4,961,055 | A * | 10/1990 | Habib et al. | 324/662 |
| 5,068,796 | A * | 11/1991 | Hellenguard et al. | 700/127 |
| 5,774,048 | A * | 6/1998 | Achterholt | 340/447 |
| 6,026,694 | A | 2/2000 | Gray | 73/867.68 |
| 6,079,282 | A | 6/2000 | Lanter | 73/862.62 |
| 2002/0063688 | A1 | 5/2002 | Shaw et al. | 345/163 |
| 2002/0191029 | A1 | 12/2002 | Gillespie et al. | 345/810 |
| 2003/0062889 | A1 | 4/2003 | Ely et al. | 324/207.17 |
| 2003/0156098 | A1 | 8/2003 | Shaw et al. | 345/163 |
| 2003/0160808 | A1 | 8/2003 | Foote et al. | 345/700 |
| 2004/0169594 | A1 | 9/2004 | Ely et al. | 341/22 |
| 2004/0178997 | A1 | 9/2004 | Gillespie et al. | 345/173 |
| 2004/0252109 | A1 | 12/2004 | Trent | 345/174 |
| 2005/0021269 | A1 | 1/2005 | Ely et al. | 345/157 |
| 2005/0024341 | A1 | 2/2005 | Gillespie et al. | 345/672 |
| 2005/0148884 | A1 * | 7/2005 | Parks et al. | 600/488 |
| 2005/0156881 | A1 | 7/2005 | Trent | 345/157 |
| 2005/0168489 | A1 | 8/2005 | Ausbeck | 345/672 |
| 2005/0171714 | A1 | 8/2005 | Ely et al. | 702/75 |

OTHER PUBLICATIONS

"Model MCL Internally Amplified Miniature Tension/Compression Load Cell", http://www.rdpelectrosense.com/load/mcl.htm, 3 pages.
"Weighing Systems: Scales, Balances and Load Cells:Setra", *Setra Weighing Systems Division;* http://www.setra.com/wei/index.htm, 2 Pages.

* cited by examiner

*Primary Examiner*—Vincent Q. Nguyen

(57) ABSTRACT

An area-change sensing through capacitive techniques is disclosed. In one embodiment, a first conductive surface is substantially parallel to a second conductive surface. The first conductive surface may be moveable relative to the second conductive surface in a direction substantially parallel to the second conductive surface. A processing module may detect an overlap area between the first conductive surface and the second conductive surface. In addition, a reference surface may be substantially parallel to the first conductive surface and the second conductive surface. The processing module may be configured to measure a reference capacitance between the reference surface and a selected surface of the first conductive surface and the second conductive surface. The processing module may apply an algorithm that considers the reference capacitance and converts a change in capacitance between the first conductive surface and the second conductive surface to at least one of a voltage response and a frequency response to determine the measurement.

21 Claims, 10 Drawing Sheets

AREA-CHANGE SENSING THROUGH CAPACITIVE TECHNIQUES

FIELD OF TECHNOLOGY

This disclosure relates generally to the technical fields of measuring devices and, in one embodiment, to area-change sensing through capacitive techniques.

BACKGROUND

A load cell may be a device (e.g., a transducer) that converts a force to a differential signal (e.g., a differential electric signal). The load cell may be used for a variety of industrial applications (e.g., a scale, a truck weigh station, a tension measuring system, a force measurement system, a load measurement system, etc.) The load cell may be created using a strain gauge. The strain gauge can be used to measure deformation (e.g., strain) of an object. The strain gauge may include a flexible backing which supports a metallic foil pattern etched onto the flexible backing. As the object is deformed, the metallic foil pattern is deformed, causing its electrical resistance to change.

The strain gauge can be connected with other strain gauges to form a load cell in a Wheatstone-bridge configuration (e.g., constructed from four strain gauges, one of which has an unknown value, one of which is variable, and two of which are fixed and equal, connected as the sides of a square). When an input voltage is applied to the load cell in the Wheatstone-bridge configuration, an output may become a voltage proportional to the force on the load cell. The output may require amplification (e.g., 125×) by an amplifier before it can be read by a user (e.g., because the raw output of the Wheatstone-bridge configuration may only be a few milli-volts). In addition, the load cell in the Wheatstone-bridge configuration may consume a significant amount of power when in operation (e.g., in milli-watts of power).

Manufacturing the load cell in the Wheatstone-bridge configuration may involve a series of operations (e.g., precision machining, attaching strain gauges, match strain gauges, environmental protection techniques, and/or temperature compensation in signal conditioning circuitry, etc.). These operations may add complexity that may deliver a yield rate of only 60% and may allow a particular design of the load cell to only operate for a limited range (e.g., between 10-5,000 lbs.) of measurement. In addition, constraints of the Wheatstone-bridge configuration may permit only a limited number of form factors (e.g., an s-type form factor and/or a single point form factor, etc.) to achieve desired properties of the load cell. The complexity of various operations to manufacture the load cell may drive the costs up (e.g., hundreds and thousands of dollars) for many industrial applications.

SUMMARY

An area-change sensing through capacitive techniques is disclosed. In one aspect, an apparatus includes a first conductive surface substantially parallel to a second conductive surface. The first conductive surface may be moveable relative to the second conductive surface in a direction substantially parallel to the second conductive surface. The apparatus may also include a processing module to detect an overlap area between the first conductive surface and the second conductive surface. The apparatus may generate a measurement (e.g., a value of force) based on a position of the first conductive surface relative to the second conductive surface.

In addition, a reference surface substantially parallel to the first conductive surface and/or the second conductive surface may be coupled (e.g., connected directly and/or indirectly) to the first conductive surface and/or the second conductive surface. The processing module may be configured to measure a reference capacitance between the reference surface and a selected surface of the first conductive surface and/or the second conductive surface. Furthermore, the processing module may apply an algorithm that considers the reference capacitance and converts a change in capacitance between the first conductive surface and the second conductive surface to a voltage response and/or a frequency response to determine the measurement. A movement may be caused by a load applied to a layer adjacent to the first conductive surface (e.g., perpendicular to, above, etc.). The first conductive surface and the second conductive surface may form a sensor capacitor (e.g., a capacitance of the sensor capacitor may correspond to the area overlapping the first conductive surface and the second conductive surface).

A reference capacitor associated with the apparatus may enable the processing module to adjust (e.g., compensate for) the capacitance based on at least one environmental condition (e.g., a humidity in a gap between the first conductive surface and the second conductive surface, a temperature of the apparatus, and/or an air pressure of an environment surrounding the apparatus, etc.). The first conductive surface and the second conductive surface may be coaxial and may have a substantially similar cross-sectional sectional shape (e.g., a circle, a square, an ellipse, a rectangle, a rounded rectangle, a pentagon, a hexagon, and/or an octagon, etc.). One or more spacers may movably separate the first conductive surface from the second conductive surface.

In another aspect, an apparatus includes a reference capacitor whose capacitance changes based on a environmental condition surrounding the apparatus and a variable capacitor whose capacitance changes based on the environmental condition and/or a change in an overlap area of a first conductive plate and a second conductive plate forming the variable capacitor (e.g., the change in the overlap area is caused by a load applied to a housing). A processing module may generate a measurement (e.g., an output data such as a reading of a force) after removing an effect of the environmental condition from a capacitance of the variable capacitor. The measurement may be of a force (e.g., a load) applied to the housing (e.g., a compressive force and/or an expansive force). The processing module may include a wireless transmitter/receiver to communicate through a network with a data processing system that analyzes data generated by various operations of the processing module.

In addition, the housing may encompass the reference capacitor, the variable capacitor, and/or the processing module. The first conductive plate may be integrated in the housing. The housing may be formed by a plurality of metal plates that are each laser etched and bonded together to create the housing. Alternatively, the housing may be formed by a single metal block that is milled to form the housing. A shielding spacer between the reference capacitor and a bottom of the housing may minimize an effect of a stray capacitance affecting the measurement. A height of the shielding spacer may be at least ten times larger than a plate spacer between plates of the reference capacitor and between plates of the sensor capacitor. Furthermore, an area of each plate forming the reference capacitor may be at least ten times larger than an area of each plate forming the sensor capacitor to reduce the amount of amplification required to generate the measurement.

In a further aspect, a method includes automatically generating a measurement based on a change in an overlap area of a first conductive surface and a second conductive surface of a variable capacitor (e.g., the first conductive surface may be substantially parallel to the second conductive surface). The first conductive surface may be movable relative to the second conductive surface in a direction substantially parallel with the second conductive surface. The method may include communicating the measurement to a data processing system associated with the variable capacitor. The method may apply an algorithm that converts a change in capacitance to a voltage response and/or a frequency response to automatically generate the measurement.

A capacitance between the first conductive surface and the second conductive surface may correspond to the overlap area of the first conductive surface and the second conductive surface. The measurement may be adjusted based on at least one environmental condition by analyzing data of a reference capacitor. A change in capacitance of the variable capacitor may be proportional to the change in the overlap area between the first conductive surface and the second conductive surface when a load is applied to the first conductive surface.

The method may include fabricating the variable capacitor and/or the reference capacitor in any geometric shape, including a rectangular shape, an oval shape, and/or a shape having sides that are not all the same length. In addition, the measurement may be wirelessly communicated through a network with a data processing system that analyzes data generated by various operations of the variable capacitor. The first conductive surface and/or the second conductive surface may be formed on a plurality of nonconductive printed circuit boards. The method may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Area-change sensing through capacitive techniques is disclosed. In the following description, for purposes of explanation, numerous specific details are set forth in order to provide a thorough understanding of the various embodiments. It will be evident, however, to one skilled in the art that the various embodiments may be practiced without these specific details. An example embodiment provides methods and systems to automatically generate a measurement based on a change in an overlap area of a first conductive surface and a second conductive surface (e.g., the first conductive surface and the second conductive surface forming a sensor capacitor).

The first conductive surface may be substantially parallel to the second conductive surface. The first conductive surface may be moveable relative to the second conductive surface in a direction substantially parallel with the second conductive surface. A reference capacitor may be used to adjust the measurement based on at least one environmental condition. The example embodiment may include communicating the measurement to a data processing system associated (e.g., through a wireless and/or a wired network) with the variable capacitor.

Also, the method may be in a form of a machine-readable medium embodying a set of instructions that, when executed by a machine, cause the machine to perform any method disclosed herein. Example embodiments of a method and a system, as described below, may be used to provide a high-accuracy, low-cost, load sensing devices (e.g., load sensors, pressure sensors, etc.). It will be appreciated that the various embodiments discussed herein may/may not be the same embodiment, and may be grouped into various other embodiments not explicitly disclosed herein.

Figure 1:
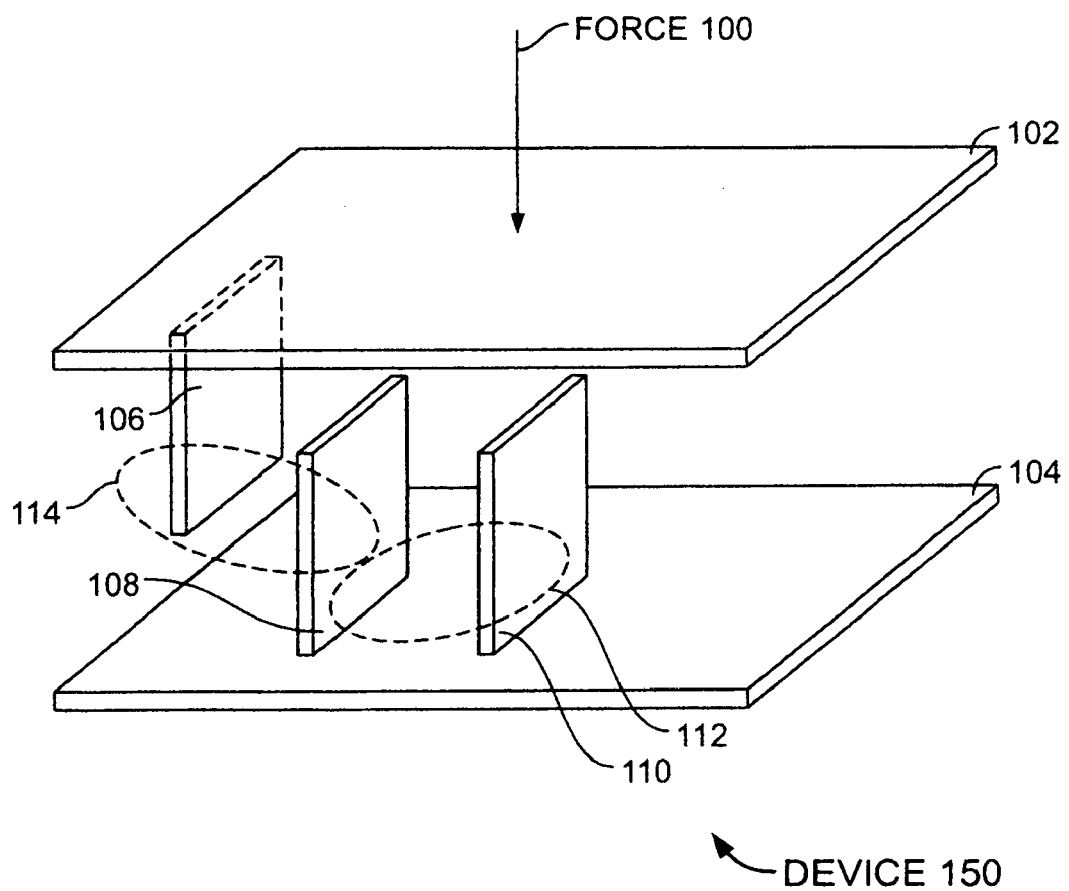
FIG. 1 is a device formed by two conductive surfaces, according to one embodiment.

FIG. 1 is a device 150 formed by a top layer 102 (e.g., a conductive and/or non-conductive substrate) and a bottom layer 104 (e.g., a conductive and/or non-conductive substrate), according to one embodiment. A force 100 is applied to the top layer 102 in FIG. 1. The top layer 102 includes a conductive surface 106. The bottom layer 104 includes a conductive surface 108 and a conductive surface 110.

The conductive surface 106 and the conductive surface 108 (e.g., the conductive surface 106 and the conductive surface 108 may be substantially parallel to each other) form a sensor capacitor 114 (e.g., the sensor capacitor 114 may be a variable capacitor formed because two conductive surfaces/plates are separated and/or insulated from each other by an air dielectric between the conductive surface 106 and the conductive surface 108) in an area that overlaps the conductive surface 106 and the conductive surface 108. The conductive surface 106 may be movable relative to the conductive surface 108 in one embodiment.

In addition, a reference capacitor 112 is formed between the conductive surface 108 and the conductive surface 110

(e.g., a reference surface). The conductive surface 110 may be substantially parallel to the conductive surface 106 and/or with the conductive surface 108 in one embodiment. In addition, the conductive surface 110 may be electrically coupled to the conductive surface 106 and/or the conductive surface 108. Since the conductive surface 108 and the conductive surface 110 may not alter positions with respect to each other when the force 100 is applied to the top layer 102, their capacitance may not change (e.g., capacitance is calculated as "capacitance=(dielectric constant multiplied by area of overlap) divided by (distance between surfaces)").

Figure 2:
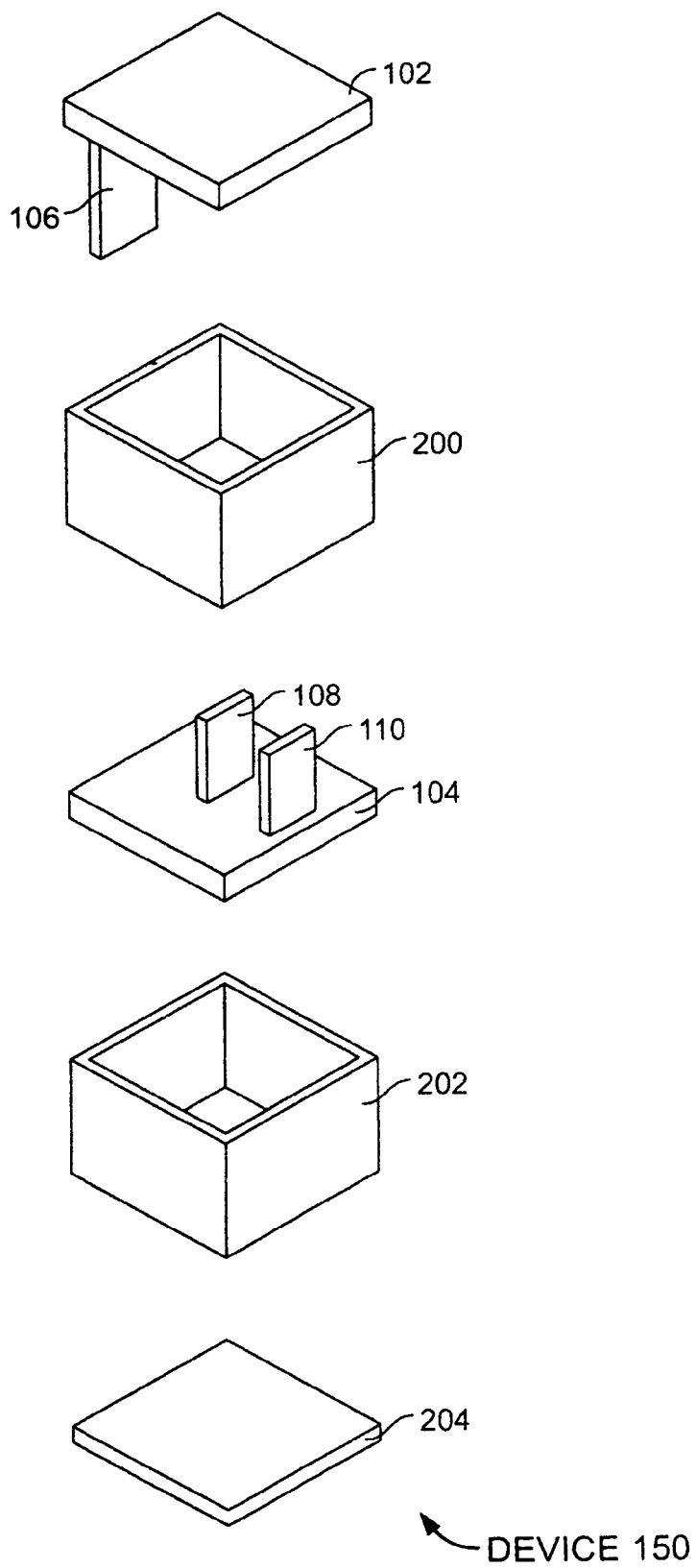
FIG. 2 is an assembly view of the device of FIG. 1, according to one embodiment.

FIG. 2 is an assembly view of the device 150, according to one embodiment. The top layer 102 and the bottom layer 104 are separated by a spacer 200 (e.g., a parameter spacer is illustrated; in other embodiments any type of spacer may be used). The spacer 200 may be used to physically separate the top layer 102 from the bottom layer 104. Similarly, the spacer 202 may be used to physically separate the bottom layer 104 from a bottom surface 204. The spacers (e.g., the spacer 200 and the spacer 202) may create gaps between various surfaces and layers. These gaps can be filled with air or any other gas (e.g., an inert gas). The bottom surface 204 may form an electromagnetic barrier for the device 150 and the outside environment (e.g., to protect against electromagnetic fields, etc.). In one embodiment, the spacer 202 is at least ten times larger than the spacer 200 to account for stray capacitance between the bottom layer 104 and the bottom surface 204. In one embodiment, the spacer 202 and the bottom surface 204 are not required, and the bottom layer 104 is the lowest layer of the device 150.

Figure 3:
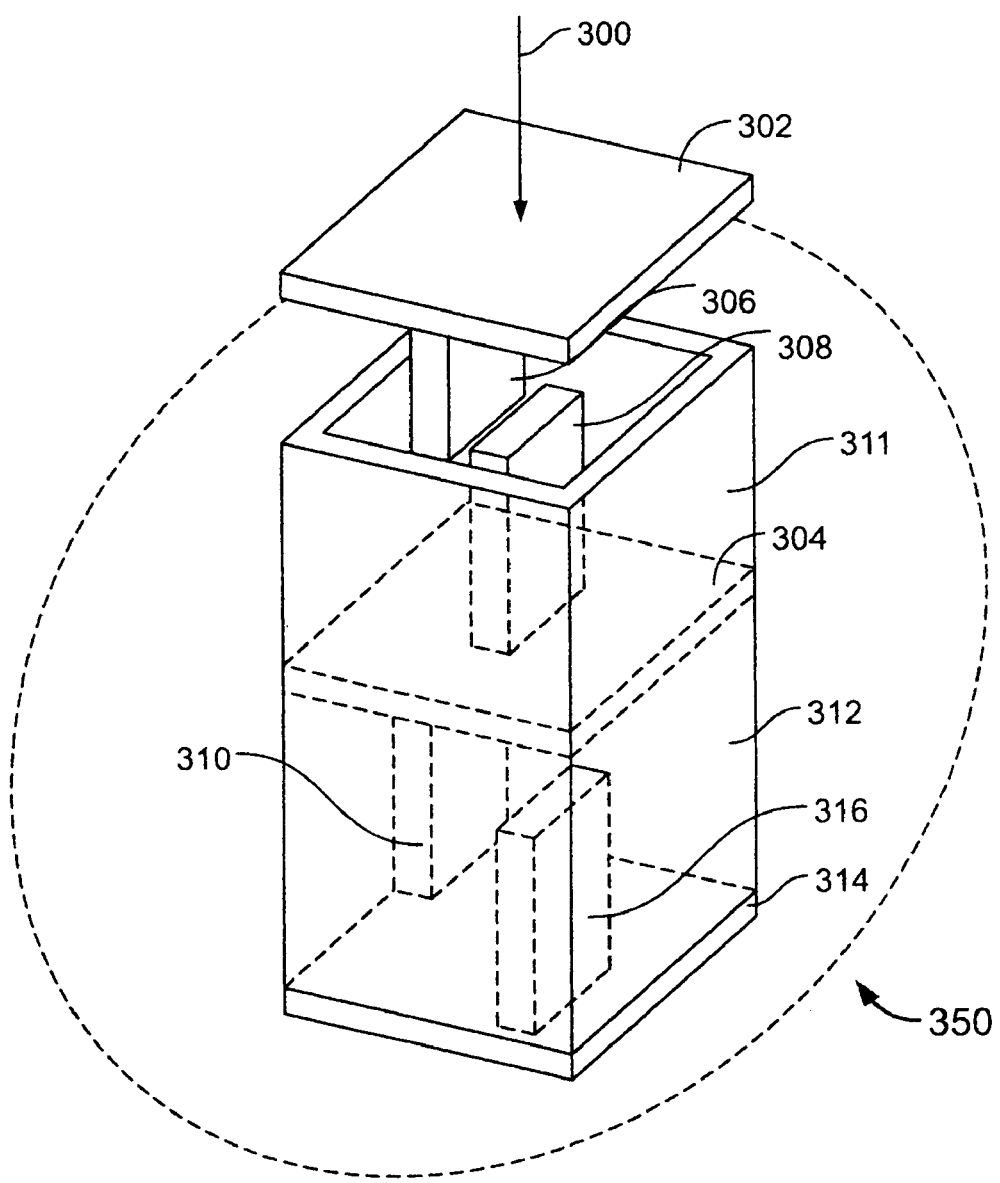
FIG. 3 is a multi-depth device, according to one embodiment.
Figure 7:
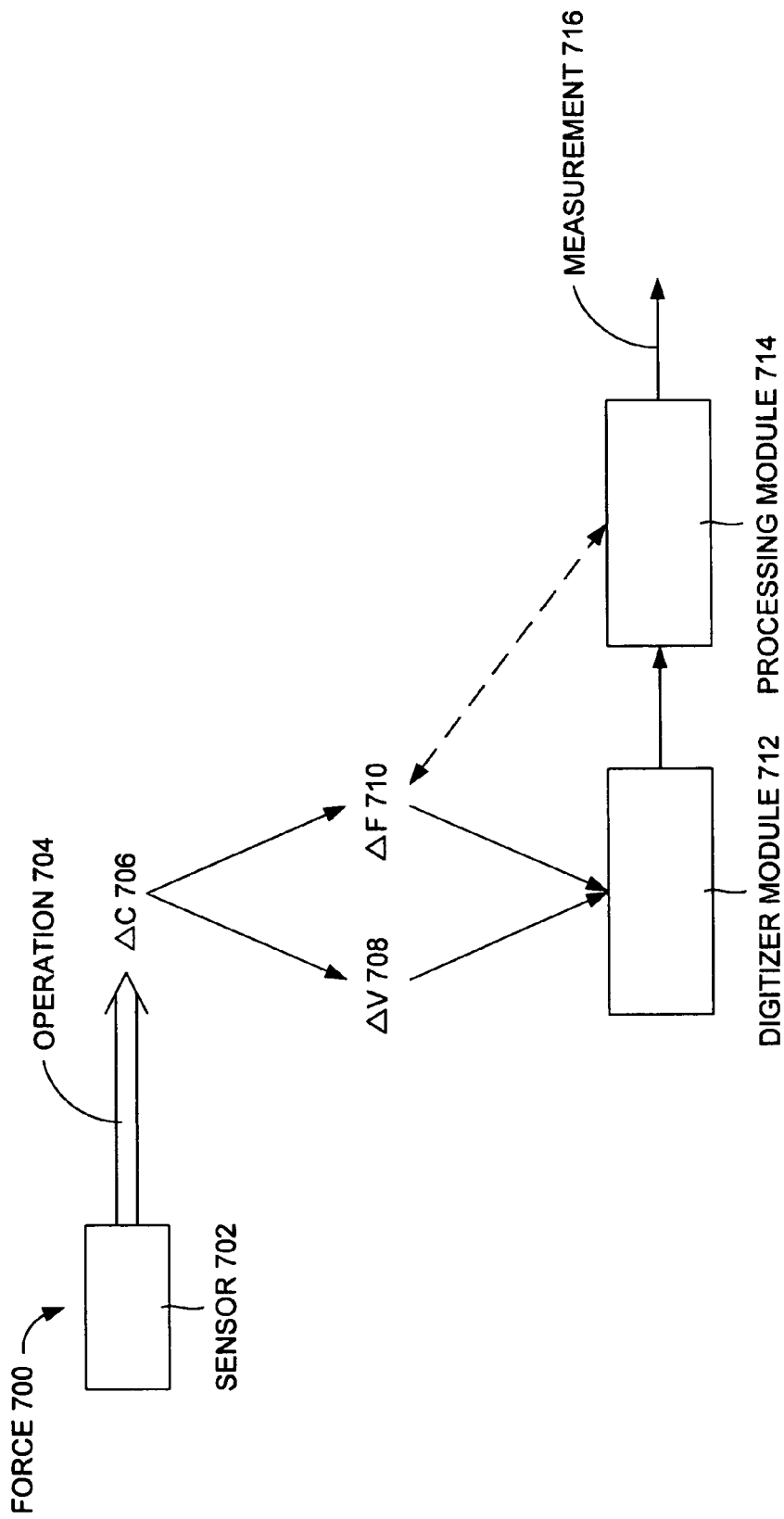
FIG. 7 is a process view of measuring a force, according to one embodiment.

FIG. 3 is a multi-depth device 350 according to one embodiment. In FIG. 3, a top layer 302, a middle layer 304, and a bottom layer 314 are illustrated. The top layer 302 includes a conductive plate 306 (e.g., a conductive surface). The conductive plate 306 may be electrically separated from the top layer 302 by application of an insulating material between an area of affixation between the top layer 302 and the conductive plate 306. A force 300 may be applied to the top layer 302 and the conductive plate 306 to cause the conductive plate 306 to deflect (e.g., move inward once a load and/or force 300 is applied to the top layer 302 as illustrated in FIG. 3). The middle layer 304 includes a conductive plate 308 and the conductive plate 310. In one embodiment, the middle layer 304 are two separate layers bonded together each having either the conductive plate 308 or the conductive plate 310. The bottom layer 314 includes a conductive plate 316. In one embodiment, there may be a shielding spacer (e.g., not shown, but the shielding spacer may be any type of spacer) between the reference capacitor (e.g., formed by the conductive plate 310 and the conductive plate 316) and a bottom of the housing (e.g., the bottom layer 314) to minimize an effect of a stray capacitance affecting the measurement (e.g., a height of the shielding spacer may be at least ten times larger than a plate spacer between plates of the reference capacitor and between plates of the sensor capacitor in one embodiment to minimize the stray capacitance). In another embodiment, an area of each plate forming the reference capacitor (e.g., the reference capacitor 112 of FIG. 1) may be at least ten times larger than an area of each plate forming the sensor capacitor (e.g., the sensor capacitor 114 of FIG. 1) to reduce amplification requirements by a processing module 714 as illustrated in FIG. 7. The conductive plate 306 and the conductive plate 308 may form a sensor capacitor (e.g., the sensor capacitor 114 as described in FIG. 1). Similarly, the conductive plate 310 and the conductive plate 316 may form a reference capacitor (e.g., the reference capacitor 112 as described in FIG. 1).

A spacer 311 may be used to physically separate the top layer 302 from the middle layer 304. A spacer 312 may be used to physically separate the middle layer 304 from the bottom layer 314. The multi-depth device 350 may be easier to manufacture according to one embodiment because of modularity of its design (e.g., various manufacturing techniques can be used to scale the multi-depth device 350 with a minimum number of sub-assemblies) in that various sub-assemblies may each include only one conductive surface (e.g., the top layer 302, the middle layer 304, and the bottom layer 316 may include only one conductive plate).

Figure 4:
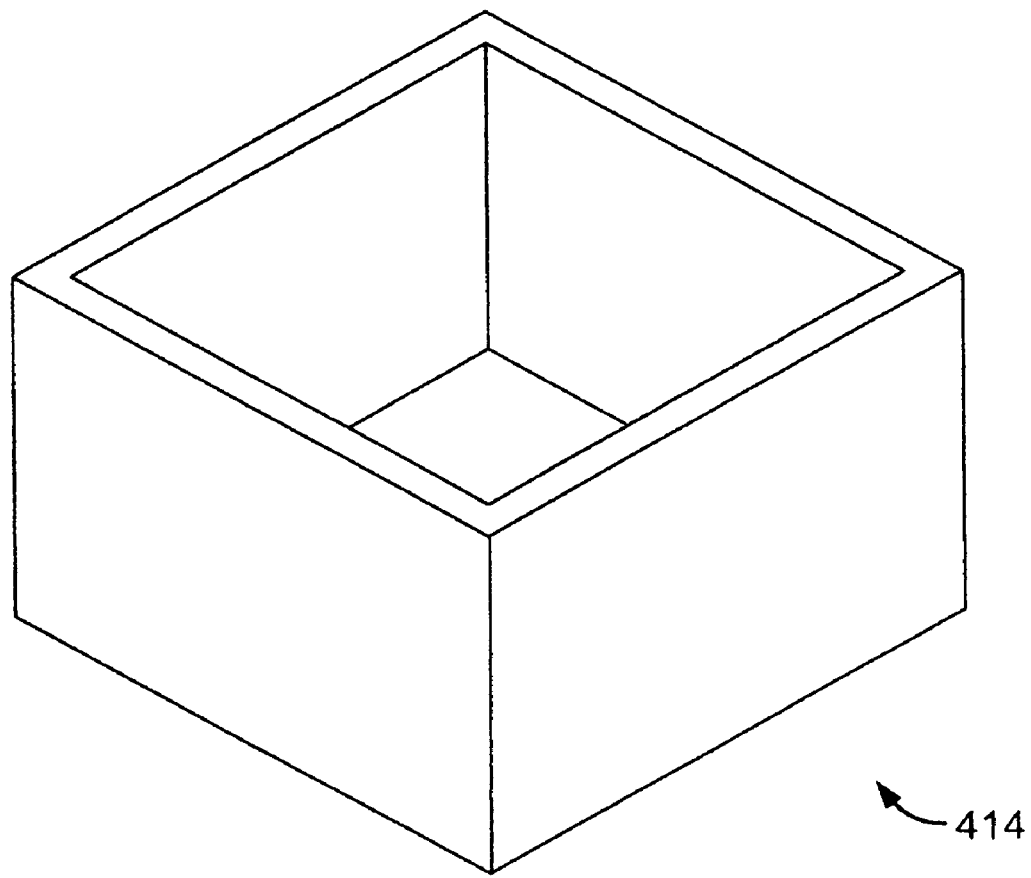
FIG. 4 is a bottom cup formed with a single block of material that can be used with the multi-depth device of FIG. 3, according to one embodiment.

FIG. 4 illustrates a bottom cup 414 (e.g., a housing) formed with a single block of material according to one embodiment. In FIG. 4, a single block (e.g., steel) is used to form the bottom cup 414. In one embodiment, the bottom cup 414 in FIG. 4 replaces the bottom layer 314 of FIG. 3, and encompasses the various structures (e.g., capacitive surfaces/plates, spacers, etc.) between the bottom layer 314 and the top plate 302 as illustrated in FIG. 3. Furthermore, in one embodiment, the top layer 302 of FIG. 3 is a lid that fits on top of the bottom cup 414. The bottom cup 414 may be formed from a single piece of metal through any process (e.g., involving cutting, milling, etching, drilling, etc.) that maintains the structural and/or tensile integrity of the bottom cup 414. This way, the bottom cup 414 may be able to withstand larger amounts of force (e.g., the force 300 of FIG. 3 applied to a housing formed by the top layer 302 of FIG. 3 and the bottom cup 414 of FIG. 4) by channeling the force downward through the walls of the bottom cup 414.

Figure 5:
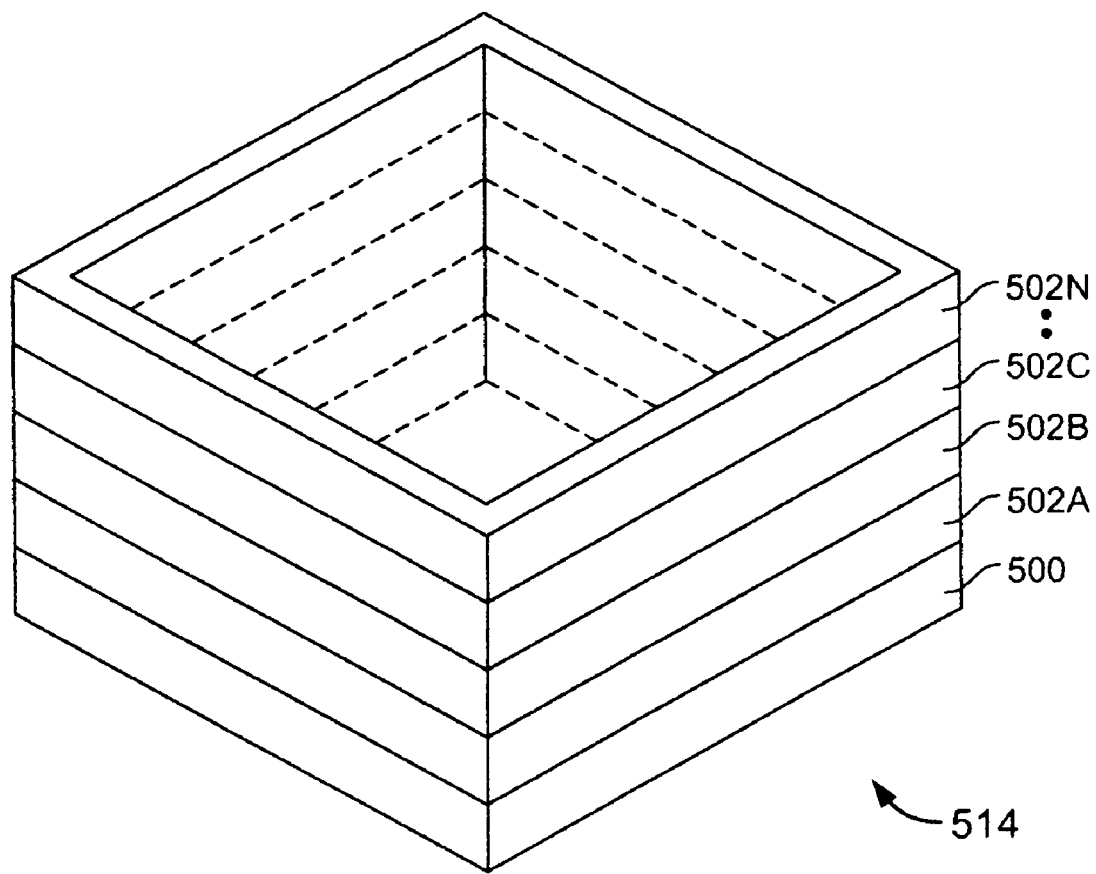
FIG. 5 is a bottom cup formed with multiple blocks of material that can be used with the multi-depth device of FIG. 3, according to one embodiment.

FIG. 5 illustrates a bottom cup 514 formed with multiple blocks of material according to one embodiment. In FIG. 5, multiple blocks (e.g., of metal such as steel) are used to form the bottom cup 514. In one embodiment, the bottom cup 514 in FIG. 5 replaces the bottom layer 314 of FIG. 3, and encompasses the various structures (e.g., capacitive surfaces/plates, spacers, etc.) between the bottom layer 314 and the top plate 312 as illustrated in FIG. 3. Furthermore, in one embodiment, the top layer 302 of FIG. 3 is a lid that fits on top of the bottom cup 514. The bottom cup 514 may be formed from multiple layers of metal that are each laser cut (e.g., laser etched) and/or patterned to form the bottom cup 514 at a cost lower than that of milling techniques in a single block. For example, the layers 502A–502N may be a standard metal size and/or shape, thereby reducing the cost of fabricating the bottom cup 514. A single metal block may form a bottom layer 500 as illustrated in FIG. 5. This way, the bottom cup 514 may be able to withstand larger amounts of force (e.g., the force 300 of FIG. 3) by channeling the force downward through the walls of the bottom cup 514.

Figure 6:
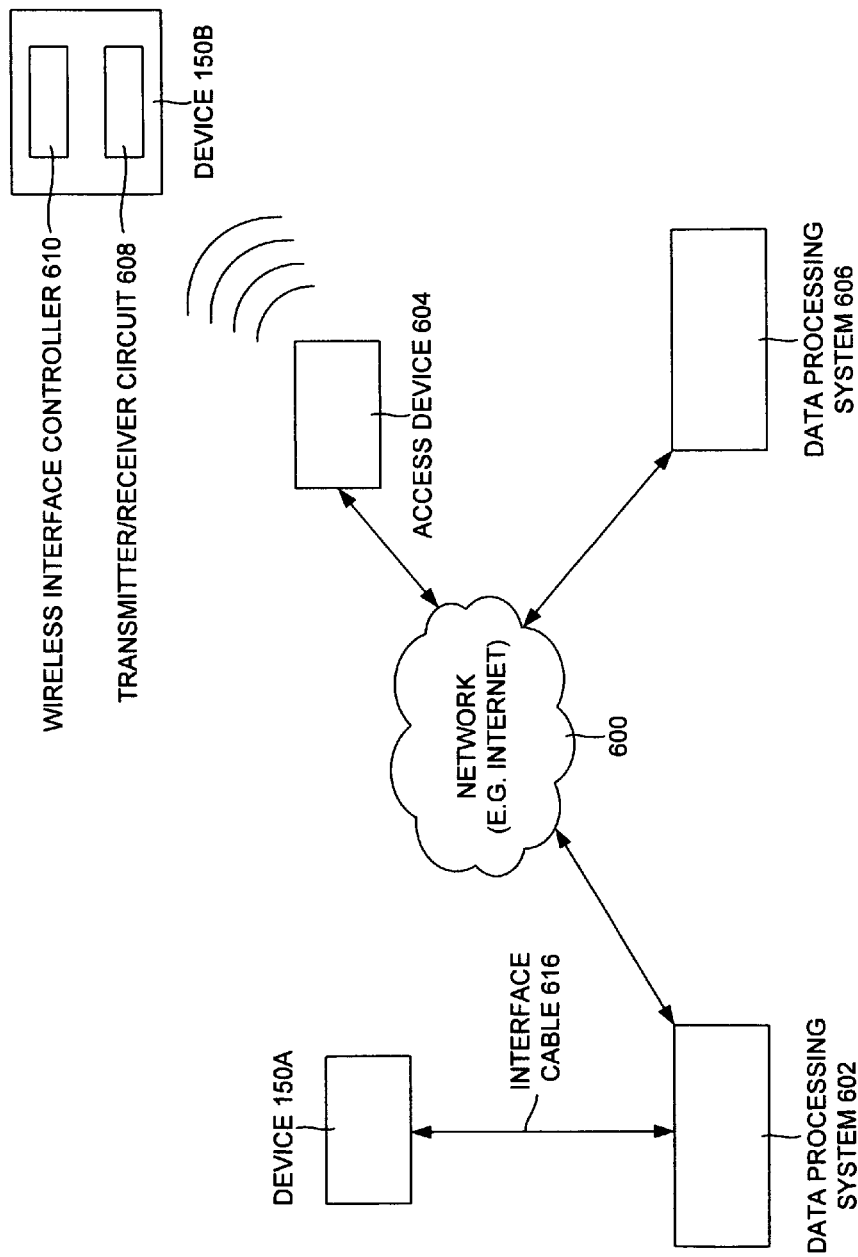
FIG. 6 is a network enabled view of the device of FIG. 1, according to one embodiment.

FIG. 6 is a network enabled view of the device 150 of FIG. 1, according to one embodiment. The first embodiment, a device 150A, is connected to a data processing system 602 through an interface cable 616. The second device 150B is wirelessly connected to the data processing system 602 through a network 600. In one embodiment, the network 600 is an Internet network. In another embodiment, the network 600 is a local area network. A data processing system 606 may receive data (e.g., output data measuring force and/or load, etc.) from the device 150A and/or the device 150B through the network 600. An access device 604 (e.g., a device that enables wireless communication between devices forming a wireless network) may provide wireless connectivity to the device 150B. In one embodiment, the device 150B includes a transmitter/receiver circuit 608 and/or a wireless interface controller 610 for enabling the device 150B to wirelessly communicate through the network 600. In one embodiment, the transmitter/receiver circuit 608 and/or the wireless interface controller 610 may be integrated in the processing module 714 of FIG. 7.

FIG. 7 is a process view of measuring a force 700, according to one embodiment. In FIG. 7, a force 700 may be applied to a sensor 702 (e.g., the top layer 102 having the conductive surface 106 of FIG. 1), according to one embodiment. In operation 704, an electronic circuitry (e.g., a software and/or hardware code) may apply an algorithm to calculate an area overlapping two surfaces/sensors forming a sensing capacitor (e.g., the portion of the conductive surface 106 and the conductive surface 108 which overlap to form the sensor capacitor 114 of FIG. 1). In an alternate embodiment, a change in distance between the plates may be considered rather than a change in area. Next, a change in capacitance 706 may be calculated based on the change in area overlapping two surfaces forming the sensor capacitor (e.g., as illustrated in FIG. 1). The change in capacitance 706, a change in voltage 708 and/or a change in a frequency 710 (e.g., a voltage response and/or a frequency response) may also be used to generate a measurement (e.g., an estimation of the force 700 applied to the sensor 702). The change in capacitance 706 data, the change in voltage 708 data, and/or the change in frequency data 710 may be provided to a digitizer module 712 (e.g., an analog-to-digital converter). Finally, the digitizer module 712 may work with the processing module 714 (e.g., a microprocessor integrated in the boxed device 350 of FIG. 3) to convert the change in capacitance 706 data, the change in voltage 708 data, and/or the change in frequency data 710 to a measurement reading (e.g., a measurement of the force 700 applied to the sensor 702). In one embodiment, the processing module 714 is integrated in the device 150 of FIG. 1, the boxed device 350 of FIG. 3, and/or a piston sensor 850 of FIG. 8.

The processing module 714 may also detect the overlap area (e.g., the sensor capacitor 114 of FIG. 1) between the first conductive surface (e.g., the conductive surface 106 of FIG. 1) and the second conductive surface (e.g., the conductive surface 108 of FIG. 1), and may generate a measurement based on a position (e.g., amount of overlap) of the first conductive surface relative to the second conductive surface. The processing module may be configured to measure a reference capacitance between the reference surface and/or a selected surface (e.g., the conductive surface 106 and/or the conductive surface 108).

Figure 8:
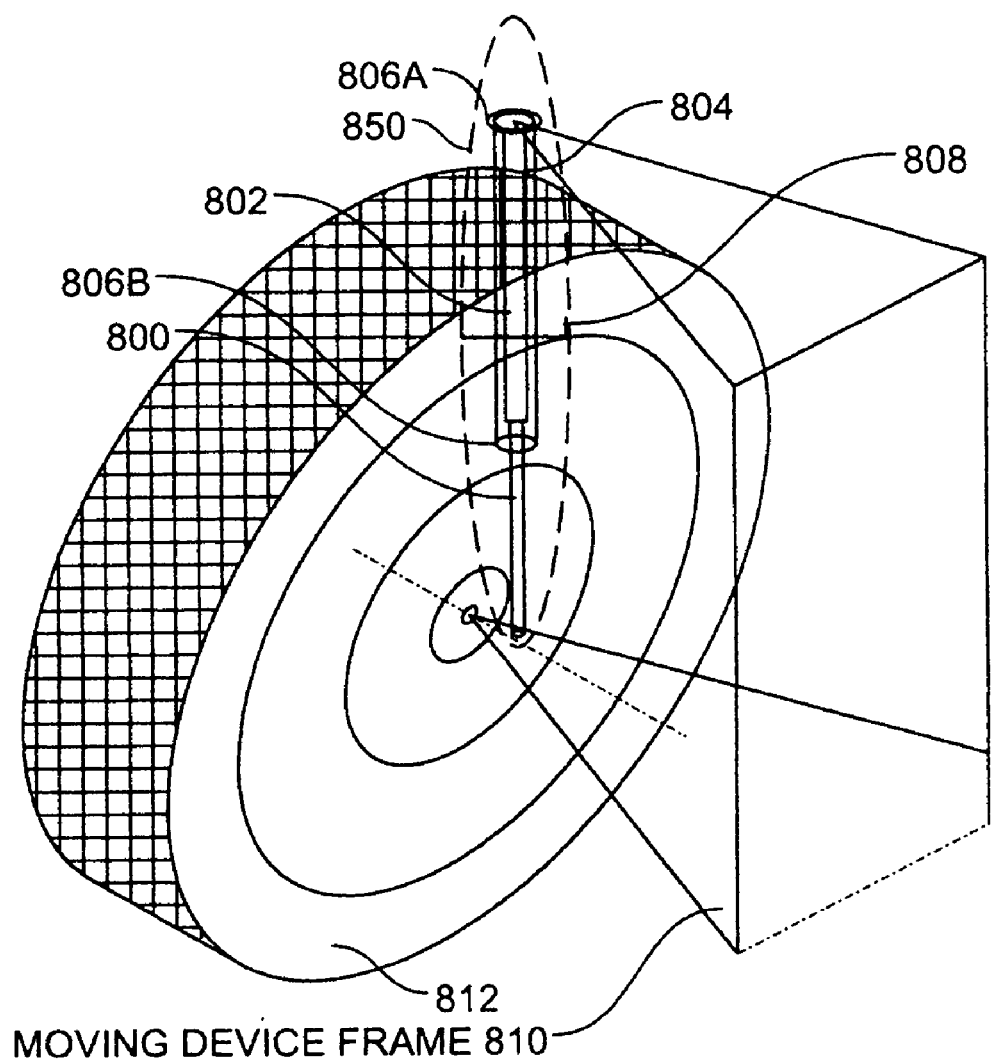
FIG. 8 is a system view of a wheel connected to a moving device frame having a piston sensor device, according to one embodiment.

FIG. 8 is a wheel 812 connected to a moving device frame 810 (e.g., the moving device frame may be an automobile, an airplane, a bicycle, etc.), according to one embodiment. In FIG. 8, the piston sensor device 850 is illustrated. In one embodiment, the piston sensor 850 of FIG. 8 applies the various operations and principles illustrated in FIGS. 1–7. The piston sensor 850 includes an inner conductive surface 800, a middle conductive 802, and an outer conductive surface 804 (e.g., may be coaxial to each other in that the inner conductive surface 800, the middle conductive 802, and/or the outer conductive surface 804 may share a common axis). In one embodiment the inner conductive surface 800, the middle conductive 802, and/or the outer conductive surface 804 have a substantially similar cross-sectional shape (e.g., a circle shape, a square shape, an ellipse shape, a rectangular shape, a rounded rectangle shape, a pentagon shape, a hexagon shape, and/or an octagon shape, etc.). In addition, the inner conductive surface 800 may be supported in the middle conductive surface 802 (e.g., a hollow tube) with a spacer 806A and a spacer 806B (e.g., the spacers may be made of Teflon). The top of the piston sensor 850 may be physically coupled to the moving device frame 810, so as the middle conductive surface 802 and the outer conductive surface 804 do not move. The inner conductive surface 800 may move with motion of the moving device (e.g., a car) and with rotation of the wheel 812.

Figure 9:
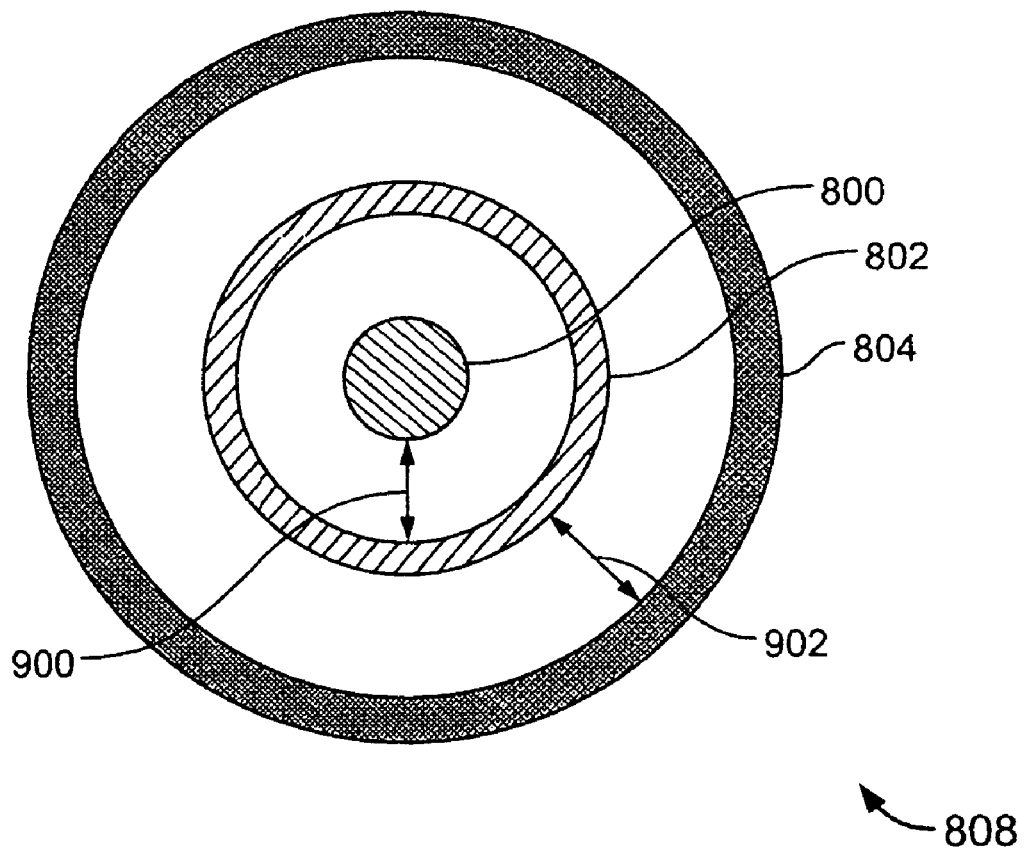
FIG. 9 is a cross sectional view of the piston sensor device of FIG. 8, according to one embodiment.

The relationship between the inner conductive surface 800, the middle conductive surface 802, and the outer conductive surface 804 of FIG. 8 may be explained in with reference to FIG. 9 (e.g., the middle conductive surface 802, and/or the outer conductive surface 804 may be created using metallic tubes). FIG. 9 is a cross sectional view 808 (e.g., as illustrated in FIG. 8) of the piston sensor 850, according to one embodiment. In FIG. 9, the inner conductive surface 800 of FIG. 8 is illustrated as a filled metal tube (e.g. in alternate embodiments may not be a filled metal tube). The middle conductive surface 802 is illustrates a hollow conductive tube. A spacer (e.g. the spacer 806A and/or the spacer 806B) may hold the inner conductive surface 800 inside the middle conductive surface 802. The inner conductive surface 800 and the middle conductive surface 802 may be separated by a gap 900. When a voltage is applied between the inner conductive surface 800 and the middle conductive surface 802 of FIG. 9, a sensor capacitor may be formed (e.g., the sensor capacitor 114 as described in FIG. 1). When the inner conductive surface 800 is moved up and/or down with movement of the wheel 812 in FIG. 8, the capacitance of the sensor capacitor may change (e.g., the change in capacitance 706 of FIG. 7).

The outer conductive surface 804 and the middle conductive surface 802 as illustrated in FIG. 9 may form the reference capacitor (e.g., the reference capacitor 112 of FIG. 1). A gap 902 (e.g., an air gap forming a gap between two metal plates and/or between metallic tubes) may exist between the middle conductive surface 802 and the outer conductive surface 804. Because the area of the middle conductive surface 802 and the outer conductive surface 804 are physically connected to the moving device frame 810 of FIG. 8, the capacitance between these two surfaces does not change because of the motion of the wheel 812 of FIG. 8 (e.g., the relative capacitance between the middle conductive surface 802 and the outer conductive surface 804 is not affected by the motion of the wheel 812). Only environmental conditions may affect the capacitance between the middle conductive surface 802 and the outer conductive surface 804. As such, the effect of these environmental conditions can be removed from a measurement of a change in capacitance between the inner conductive surface 800 and the middle conductive surface 802 to more accurately determine a change in capacitance because of motion of the wheel 812.

Figure 10:
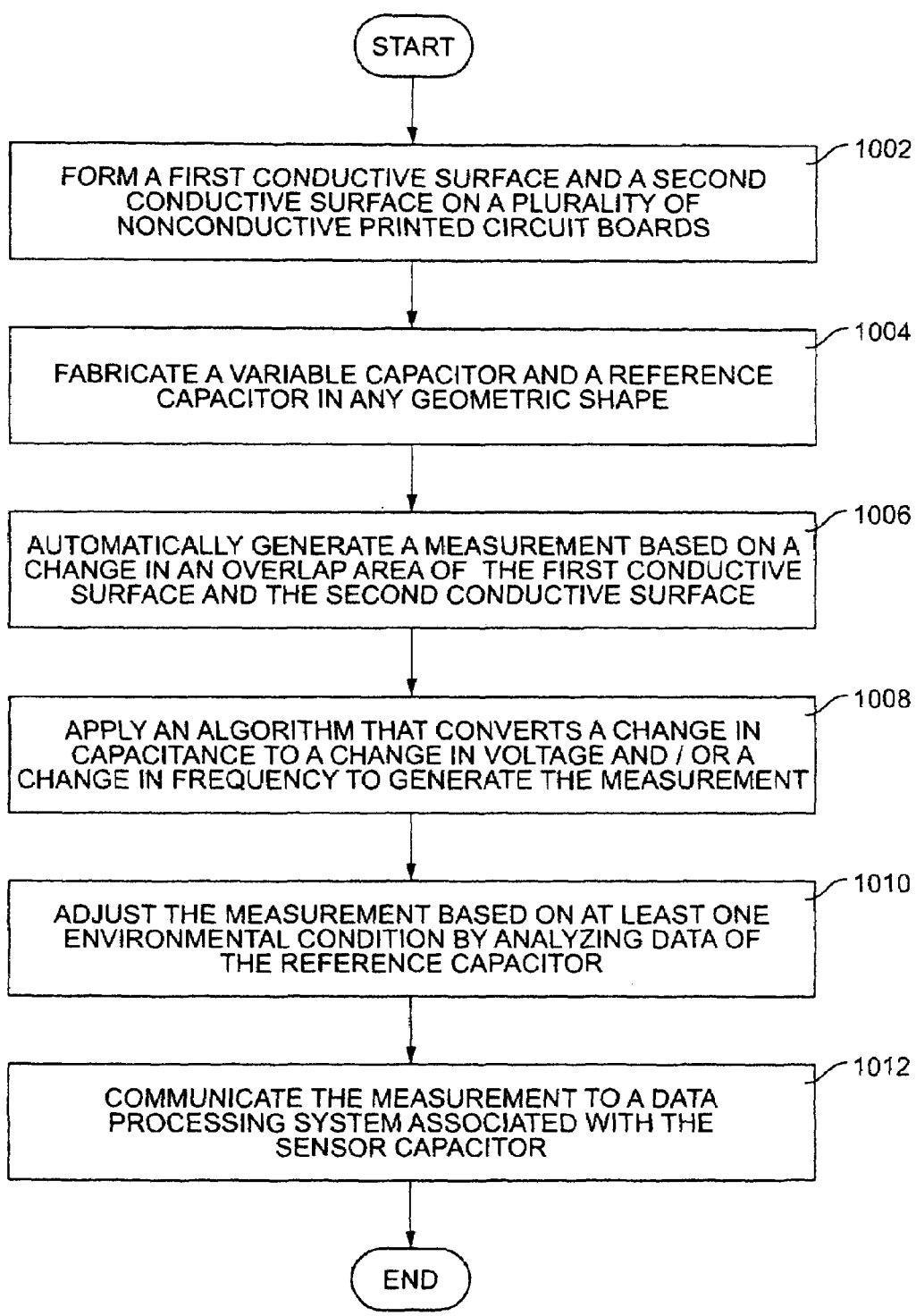
FIG. 10 is a process flow to automatically generate a measurement based on an overlap area of a first conductive surface and a second conductive surface, according to one embodiment.

FIG. 10 is a process flow to automatically generate (e.g., using the processing module 714 as illustrated in FIG. 7) a measurement based on an overlap area (e.g., the overlap area illustrated by the sensor capacitor 114 in FIG. 1) of a first conductive surface and a second conductive surface, according to one embodiment. In operation 1002, a first conductive surface (e.g., the conductive surface 106 of FIG. 1) and second conductive surface (e.g., the conductive surface 108 of FIG. 1) is formed (e.g., bonded, grown, glued, etc.) on non-conductive printed circuit boards (e.g., the top layer 102 and the bottom layer 104 respectively).

Then, in operation 1004, a sensor capacitor (e.g., the sensor capacitor 114 of FIG. 1) and a reference capacitor (e.g., the reference capacitor 112 of FIG. 1) is fabricated in any geometric shape (e.g., plates of the sensor capacitor and/or the reference capacitor are formed in a rectangular shape, a square shape, a circle shape, etc.). In operation 1006, a measurement is automatically generated based on a change in an overlap area of the first conductive surface (e.g., the conductive surface 106 of FIG. 1) and the second conductive surface (e.g., the conductive surface 108 of FIG. 1). For example, the area of overlap may change when the force 100 of FIG. 1 is applied on the device 150, the multi-depth device 350, and/or the piston-sensor device 850). In one embodiment, the change in the area is caused by a deflection of the first conductive surface (e.g., the conductive surface 108 may deflect when the force 100 of FIG. 1 is applied) with respect to the second conductive surface. In operation 1008, an algorithm (e.g., an iterative algorithm) may be applied that converts a change in capacitance to at least one of a change in voltage and/or a change in frequency to generate the measurement. In operation 1010, the measurement is adjusted based on at least one environmental condition by analyzing data of the reference capacitor (e.g., the environmental condition may be humidity in a gap between the first conductive surface and the second conductive surface, a temperature of the apparatus, and/or an air pressure of an environment surrounding the apparatus, etc.). The measurement may be communicated to a data processing system (e.g., the data processing system 602 as illustrated in FIG. 6) associated (e.g., either through the cable 616 and/or through the network 600 of FIG. 6) with the variable capacitor (e.g., the sensor device 114 in the device 150 of FIG. 1) in operation 1012.

Although the present embodiments have been described with reference to specific example embodiments, it will be evident that various modifications and changes may be made to these embodiments without departing from the broader spirit and scope of the various embodiments. For example, the transmitter/receiver circuit 608 of FIG. 6, the wireless interface controller 610 of FIG. 6, and/or the processing module 714 of FIG. 7 described herein may be enabled and operated using hardware circuitry (e.g., CMOS based logic circuitry), firmware, software and/or any combination of hardware, firmware, and/or software (e.g., embodied in a machine readable medium).

For example, the digital converter module 712 and/or the processing module 714 may be enabled using software and/or using transistors, logic gates, and electrical circuits (e.g., application specific integrated ASIC circuitry) such as a digital converter circuit and/or a processing circuit. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An apparatus comprising:
    a first conductive surface substantially parallel to a second conductive surface and moveable relative to the second conductive surface in a direction substantially parallel to the second conductive surface;
    a processing module to detect an overlap area between the first conductive surface and the second conductive surface and to generate a measurement based on a position of the first conductive surface relative to the second conductive surface; and
    a reference surface substantially parallel to the first conductive surface and the second conductive surface, the reference surface coupled to at least one of the first conductive surface and the second conductive surface.

2. The apparatus of claim 1 wherein the processing module is configured to measure a reference capacitance between the reference surface and a selected surface of the first conductive surface and the second conductive surface.

3. The apparatus of claim 2 wherein the processing module applies an algorithm that considers the reference capacitance and converts a change in capacitance between the first conductive surface and the second conductive surface to at least one of a voltage response and a frequency response to determine the measurement.

4. The apparatus of claim 1 wherein a movement is caused by a load applied to a layer adjacent to the first conductive surface.

5. The apparatus of claim 1 wherein the first conductive surface and the second conductive surface form a sensor capacitor, and wherein a capacitance of the sensor capacitor corresponds to the area overlapping the first conductive surface and the second conductive surface.

6. The apparatus of claim 1 further comprising a reference capacitor associated with the apparatus to enable the processing module to adjust the capacitance based on at least one environmental condition.

7. The apparatus of claim 6 wherein the at least one environmental condition is selected from a group comprising a humidity in a gap between the first conductive surface and the second conductive surface, a temperature of the apparatus, and an air pressure of an environment surrounding the apparatus.

8. The apparatus of claim 1 wherein the first conductive surface and the second conductive surface are coaxial.

9. The apparatus of claim 8 wherein the first conductive surface and the second conductive surface have a substantially similar cross-sectional shape.

10. The apparatus of claim 9 wherein the substantially similar cross-sectional shape corresponds to a shape selected from a group comprising a circle, a square, an ellipse, a rectangle, a rounded rectangle, a pentagon, a hexagon, and an octagon.

11. The apparatus of claim 1 further comprising at least one spacer to movably separate the first conductive surface from the second conductive surface.

12. A method, comprising:
    generating a first measurement based on a change in an overlap area of a first conductive surface and a second conductive surface of a variable capacitor, the first conductive surface substantially parallel to the second conductive surface, the first conductive surface moveable relative to the second conductive surface in a direction substantially parallel with the second conductive surface;
    generating a second measurement based on at least one environmental condition by analyzing data of a reference capacitor, wherein the at least one environmental condition is humidity in a gap between the first conductive surface and the second conductive surface, a temperature of the variable capacitor, and an air pressure of an environment surrounding the variable capacitor;
    applying the second measurement to the first measurement to produce a measurement; and
    communicating the measurement to a data processing system associated with the variable capacitor.

13. The method of claim 12 further comprising applying an algorithm that converts a change in capacitance to at least one of a voltage response and a frequency response to automatically generate the measurement.

14. The method of claim 12 wherein a capacitance between the first conductive surface and the second conductive surface corresponds to the overlap area of the first conductive surface and the second conductive surface.

15. The method of claim 12 wherein a change in capacitance of the variable capacitor is proportional to the change in the overlap area between the first conductive surface and the second conductive surface when a load is applied to the first conductive surface.

16. The method of claim 15 further comprising fabricating the variable capacitor and the reference capacitor in any geometric shape, including a rectangular shape, an oval shape, and a shape having sides that are not all the same length.

17. The method of claim 12 further comprising wirelessly communicating the measurement through a network with a data processing system that analyzes data generated by various operations of the variable capacitor.

18. The method of claim 12 further comprising forming the first conductive surface and the second conductive surface on a plurality of nonconductive printed circuit boards.

19. The method of claim 12 in a form of a machine-readable medium embodying a set of instructions that, when executed by a machine, cause the machine to perform the method of claim 12.

20. The method of claim 19 further comprising separatively housing the variable capacitor having the first conductive surface and the second conductive surface and the reference capacitor having two parallel conductive surfaces.

21. The method of claim 20 wherein the variable capacitor is formed between the first conductive surface perpendicularly coupled to a top layer of a capacitive sensor device and the second conductive surface perpendicularly coupled to a middle layer of the capacitive sensor device and wherein the reference capacitor is formed between the two parallel conductive surfaces each coupled to the middle layer and a bottom layer of the capacitive sensor device.

* * * * *

UNITED STATES PATENT AND TRADEMARK OFFICE
CERTIFICATE OF CORRECTION

PATENT NO. : 7,187,185 B2  Page 1 of 1
APPLICATION NO. : 11/237353
DATED : March 6, 2007
INVENTOR(S) : William D. Dallenbach and Divyasimha Harish It is certified that error appears in the above-identified patent and that said Letters Patent is hereby corrected as shown below:

1. Title Page, item [73] Assignee: should read --Loadstar Sensors, Inc.--

2. On Page 1, Col. 1, under the "References Cited" (U.S. Patent Documents) in Line 5, please delete "73,867.68" and insert --73/862.68--

3. In "Figures" on Sheet 6 of 10 (Fig. 6) in Line 1, please delete "REPLACEMENT SHEET" in the top margin. (above "WIRELESS INTERFACE CONTROLLER 610")

4. In Col. 1, Line 46, please insert --,-- (comma) after "60%".

5. In Col. 1, Line 53, please delete "the" after "drive".

6. In Col. 2, Line 33, please delete "sectional" before "shape".

7. In Col. 9, Line 6, please delete ")" closing bracket) after "850".

Signed and Sealed this

Twenty-second Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 7,187,185 B2  Page 1 of 1
APPLICATION NO. : 11/237353
DATED : March 6, 2007
INVENTOR(S) : William D. Dallenbach and Divyasimha Harish It is certified that error appears in the above-identified patent and that said Letters Patent is hereby corrected as shown below:

1. Title page item [73] insert --Assignee: Loadstar Sensors, Inc.--

2. On Page 1, Col. 1, under the "References Cited" (U.S. Patent Documents) cited by the Applicant and considered by the Examiner, in Line 5, please delete "73,867.68" and insert --73/862.68--

3. In "Figures" on Sheet 6 of 10 (Fig. 6) in Line 1, please delete "REPLACEMENT SHEET" in the top margin. (above "WIRELESS INTERFACE CONTROLLER 610")

4. In the "Background" of the Specification of the Issued Patent, in Col. 1, Line 46, please insert --,-- (comma) after "60%".

5. In the "Background" of the Specification of the Issued Patent, in Col. 1, Line 53, please delete "the" after "drive".

6. In the "Summary" of the Specification of the Issued Patent, in Col. 2, Line 33, please delete "sectional" before "shape".

7. In "Detailed Description" of the Specification of the Issued Patent, in Col. 9, Line 6, please delete ")" closing bracket" after "850".

Signed and Sealed this

Fifth Day of February, 2008

JON W. DUDAS
*Director of the United States Patent and Trademark Office*